Aug. 20, 1940.   A. W. BASHAM ET AL   2,212,003
MACHINE FOR MAKING HANDLED EDIBLES
Original Filed Nov. 5, 1938

INVENTORS.
A. W. Basham & E. I. Basham
BY M. Talbert Dick
ATTORNEY.

Patented Aug. 20, 1940

2,212,003

UNITED STATES PATENT OFFICE 2,212,003

MACHINE FOR MAKING HANDLED EDIBLES

Arthur W. Basham and Eva I. Basham, Indianola, Iowa

Application November 5, 1938, Serial No. 239,034
Renewed July 3, 1940

2 Claims. (Cl. 53—10)

The principal object of this invention is to provide a machine for making baked or cooked edibles such as doughnuts and like that permits the embedding of a handle member in the dough or batter during the cooking process.

A further object of this invention is to provide a doughnut or like baking or cooking mold machine that is so constructed as to insure a clean-cut hole through the center of the doughnut or like after the same has been cooked or baked and has been removed from the machine.

A still further object of this invention is to provide a machine for making doughnuts and like that is handy in operation, economical in manufacture, and durable in use.

These and other objects will be apparent to those skilled in the art.

Our invention consists in the construction, arrangement and combination of the various parts of the device, whereby the objects contemplated are attained as hereinafter more fully set forth, pointed out in our claims and illustrated in the accompanying drawing, in which:

Our machine is designed particularly for the production of a handled edible such as explained and shown in our co-pending application for United States Letters Patent No. 237,966, filed in the United States Patent Office on Oct. 31, 1938. Molds electrically heated for the making or doughnuts or like are old. One of the objections of these machines is that they do not produce a clean-cut hole through the center of the doughnut. Another objection to these machines is that they have no provision for the extension of a handle member into the mold portions for making a doughnut or the like having a handle member. We have overcome such objections by providing a machine that is capable of producing a doughnut having a clean-cut central hole and a wooden or like handle extending into its mass.

Figure 1:
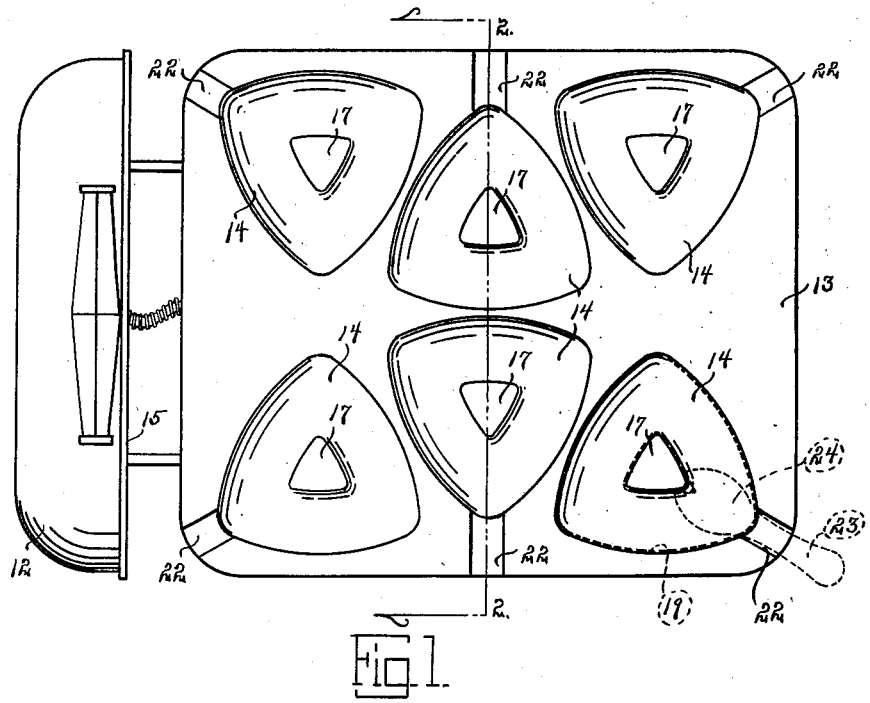
Fig. 1 is a top plan view of our machine with the upper mold lid portion open.
Figure 2:
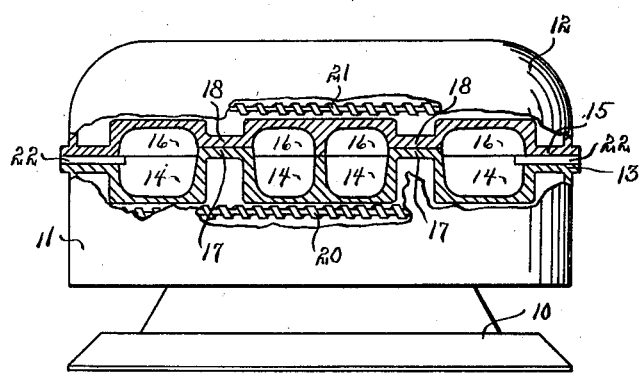
Fig. 2 is a cross sectional view of the mold portion of our device taken on substantially line 2—2 of Fig. 1 with the upper lid closed.

Referring to the drawing, we have used the numeral 10 to designate the base portion of our machine. The numeral 11 designates the lower fixed housing on the base 10. The numeral 12 designates the upper lid housing hingedly secured in the usual manner to the lower portion 11. The numeral 13 designates the lower mold portion in the lower housing 11. This mold 13 has a plurality of depressions or cavities 14 as shown in Fig. 1. The numeral 15 designates the upper portion of the mold and which is positioned in the lid housing 12. This upper mold portion 15 has depressions or cavities 16. When the lid is closed as shown in Fig. 2, the depressions or cavities 16 register with the depressions or cavities 14 respectively, and together form a plurality of enclosed compartments. Each of the depressions 14 are in the form of a circular ring, thereby leaving in the center of each depression, an upwardly extending projection or island 17. These projections or islands 17 extend upwardly to a plane above the plane of the main portion of the mold 13, and are substantially triangular in cross section as shown in Fig. 1. The registering depressions 16 in the upper mold 15 are also of circular ring structure and have central downwardly extending projections or islands 18, when the lid is closed as shown in Fig. 2. These downwardly extending projections 18 are of the same shape and engage and conform to the upwardly extending projections 17 when the lid of the device is closed. The lower plane of these projections 18 is above the plane of the main portion of the upper mold 15. When the upper and lower molds are in closed relationship to each other, the registering depressions 14 and 16 form the general outline of the outer sides of the doughnuts and the island projections form the triangular holes extending through the doughnuts. To accomplish this, the depressions 14 and 16 have rounded bottoms. When the depressions 14 and 16 are of a design similar to that shown in Fig. 1, doughnuts will be produced from such machines having a shape substantially like the doughnut 19 shown in Fig. 3. The specific shape of the doughnut and the specific shapes of the depressions in the molds, however, are not important to this case. The numerals 20 and 21 designate ordinary metallic resistant wires below the plate mold 13 and above the plate mold 15 and are designed to be in communication with a source of electrical energy. Such methods of heating, cooking and baking molds are very old and we make no claim to any specific means for heating the upper and lower molds of our machine. As is well known, to operate such mold machines, it is merely necessary to raise the lid 12 and place the dough or batter in the depressions 14 after which the lid 12 is closed. With the mold plates 13 and 15 in heated condition, the dough or batter will rise during the cooking or baking process completely filling the lower depression and the upper depression of each of the mold compartments.

After the edible has been cooked or baked, the lid portion 12 is raised, thereby breaking the molds in two at horizontal center lines and exposing the cooked edible, which is then removed manually from the upper or lower mold. By forming the islands or projections 17 so that their upper planes are above the upper plane of the main portion of the mold 13 and by accordingly restricting the lengths of the islands 18, the break line of the mold as it crosses these portions of the mold that forms the center hole of the doughnut will be on a line plane substantially above the main line plane of the break line of the mold as shown in Fig. 2. By this construction, a doughnut will be produced having a clean-cut hole in its center. The reason for this is that the dough or batter when placed in the depressions 14 will not run over the top surface of the island projections 17 and by the time the batter or dough reaches the line between the island projections 17 and 18, by rising from heat, the dough or batter will be in such cooked condition as to not run between the island projections 17 and 18. This feature is highly important if a doughnut is desired having clean-cut, graceful lines.

Figure 3:
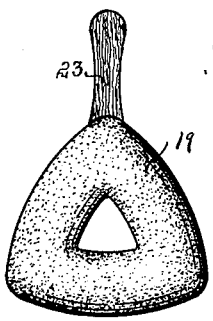
Fig. 3 is a top plan view of a doughnut or the like made from our machine.

The numeral 22 designates a flat bottomed channel groove extending from each of the depressions 14 in the mold 13 and extending to the outer edge and communicating with the outer edge of the mold 13 as shown in Fig. 1 and Fig. 2. When the lid portion 12 is in a closed condition, a passageway will thereby be provided as shown in Fig. 2 leading from the outside of the machine to each of the doughnut forming compartments of the machine. These passageway channel grooves permit the placement of the forward end of a handle member 23 into each of the doughnut compartments as shown by dotted lines in Fig. 1. These handles 23 may be of wood or other suitable material and have an enlarged head portion 24 which is baked or cooked inside the edible. To make an edible having such a handle, it is merely necessary after the dough or batter has been placed in the depressions 14 to lay a handle member in each of the channel grooves 22 and then close the lid for the baking process. The dough or batter will rise and extend completely around the head portion of the handle member. To insure the successful surrounding of the forward end of each of the handle members by the edible during the cooking process, it is recommended that a little dough or batter be poured on top of the forward end portion of each of the handle members or, if desired, the handle members may be first placed in proper position with their forward end portions resting on the dough and then turned over. Obviously, some of the dough will stick to the handle members and will be brought to the top of the handle member by turning the handle member over. In order that the forward end 24 of the handle member will be of maximum size, we have notched the forward end of each of the handle members as shown in Fig. 1 so that the forward end of each of the handle members will engage and extend to each side of an island projection 17. This acts in supporting and holding the forward end of the handle members in proper position, and is one reason why we recommend that the island projections 17 be substantially triangular in cross section with one of the corner side edges of each of the island projections extending toward a channel groove 22 as shown in Fig. 1. Obviously, the rear end portions of the handle 23 extend through the slots 22 and communicate with the outside atmosphere. By this arrangement of parts, the outer ends of the handles 23 will be kept in a comparatively cool condition during the cooking process. This means that after the cooking or baking of the edible and the lid 17 is raised, these handles 23 may be easily grasped, thereby greatly facilitating the removal of the doughnuts or like from the molds. As the handle is baked or cooked in the edible, it will become an integral part to all intents and purposes of the edible as shown in Fig. 3 and may be used to facilitate the eventual eating of the edible. From the foregoing it will readily be seen that we have provided a highly desirable machine for making handled doughnuts or the like.

Some changes may be made in the construction and arrangement of our improved machine for making handled doughnuts without departing from the real spirit and purpose of our invention, and it is our intention to cover by our claims any modified forms of structure or use of mechanical equivalents which may be reasonably included within their scope.

We claim:

1. In a device of the class described, a lower mold plate, a depression in said lower mold plate, an island projection extending upwardly from the center of said depression terminating in a plane above the plane of said mold plate, an upper mold plate, a depression in said upper mold plate capable of registering with the depression in said lower mold plate, and an island projection in the center of said last mentioned depression capable of registering with and engaging said first mentioned island projection.

2. In a device of the class described, a lower mold plate, a depression in said lower mold plate, an island projection extending upwardly from the center of said depression terminating in a plane above the plane of said mold plate, an upper mold plate, a depression in said upper mold plate capable of registering with the depression in said lower mold plate, an island projection in the center of said last mentioned depression capable of registering with and engaging said first mentioned island projection, and a channel groove in one of said mold plates communicating with a depression therein and designed for the reception of a handle member.

ARTHUR W. BASHAM.
EVA I. BASHAM.